Patented Jan. 25, 1938

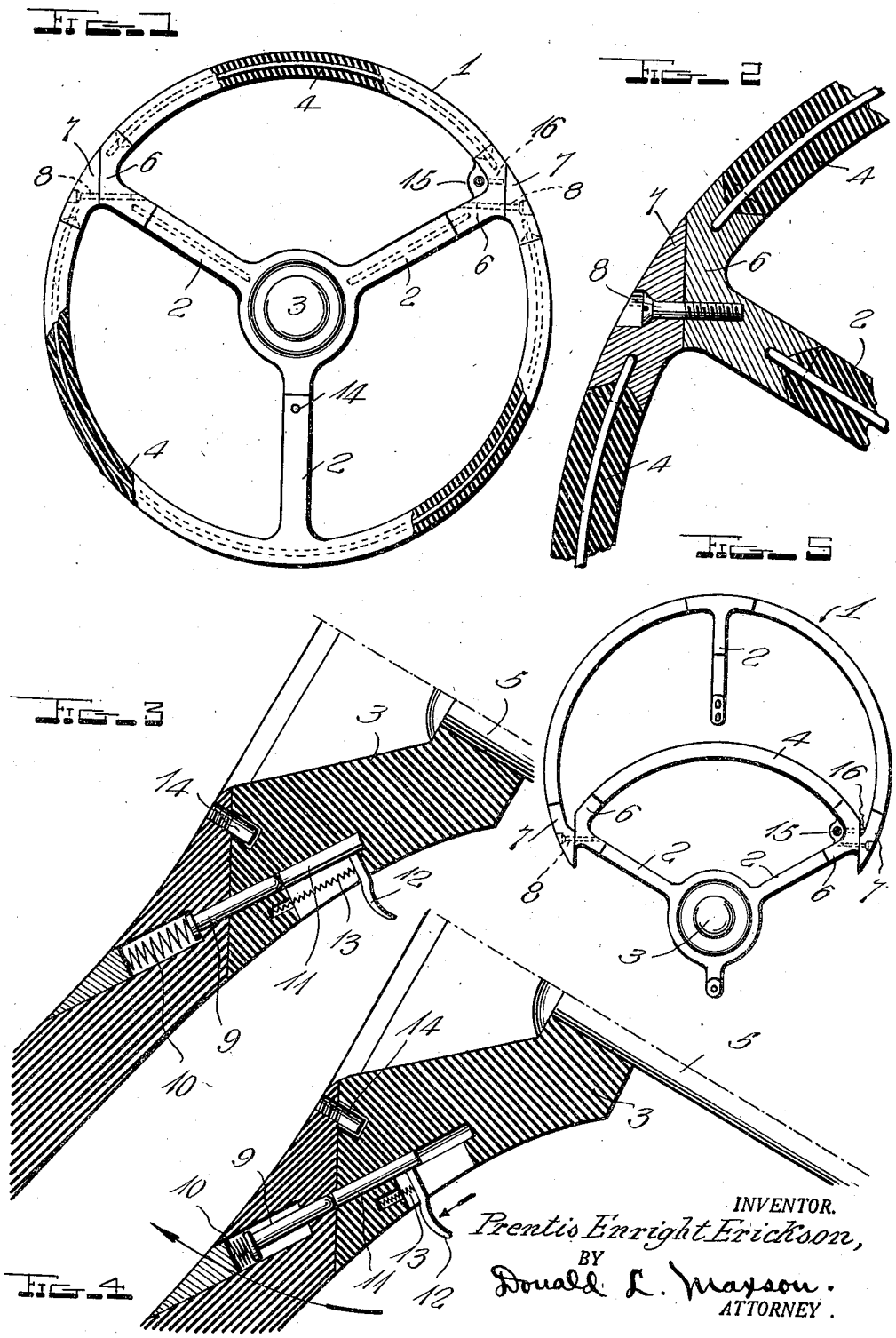

2,106,169

UNITED STATES PATENT OFFICE 2,106,169

AUTOMOBILE STEERING WHEEL

Prentis Enright Erickson, Minneapolis, Minn., assignor to James B. Bradshaw, Minneapolis, Minn.

Application November 17, 1936, Serial No. 111,311

2 Claims. (Cl. 74—555)

This invention relates to improvements in automobile steering wheels, and more particularly to a wheel which will have the major portion pivoted so that it may be swung outwardly from the driver's body in a forward and upward position, whereby free and unobstructed seating to and from the driver's seat in the automobile may be easily accomplished.

An object of the invention is to provide an improved steering wheel for automobiles which will be formed with a pair of split castings at the junction points of two spokes and the rim of the wheel, and having alined pivot pins in said castings, forming transversely alined hinges positioned well in front of the steering post or column of the automobile, whereby when the steering wheel is swung upwardly and forwardly, the driver may get into or out of the driver's seat just as readily as if there was no steering wheel in front of him.

Another object of the invention is to provide an improved steering wheel for automobiles which will be formed with a pair of split castings at the junction points of two spokes and the rim of the wheel, and having alined pivot pins connecting said split castings forming hinges which will be entirely housed within the usual confines of a steering wheel, and will permit the swinging upwardly and forwardly of the major portion of the wheel, for ready and unobstructed access to or from the driver's seat in the automobile.

A still further object of the invention is to provide a steering wheel for automobiles so constructed that the major portion of the wheel may be swung upwardly and forwardly when a person wished to get into or out of the driver's seat and the further provision of a double locking means for holding the wheel in its normal or driving position.

Another object of the invention is to provide an improved steering wheel for automobiles, which will be provided with spaced alined hinges at the junction points of two spokes and the rim of the wheel, and said hinges and associated parts being completely contained within the usual confines of a steering wheel, and the additional feature of a lock positioned adjacent one of said hinges, whereby the wheel when raised to give ready access to the driver's seat, may be locked in this position.

Other objects will appear as the description proceeds.

In the accompanying drawing which forms a part of my application,

Figure 1 is a top plan view of my improved steering wheel, a portion thereof being shown in section;

Figure 2 is an enlarged detail view of one of the split casting hinges and associated parts;

Figure 3 is an enlarged sectional view of the wheel locking mechanism, showing the same in locked position;

Figure 4 is an enlarged sectional view of the wheel locking mechanism, showing the same unlocked and ready to be raised in the direction of the arrow, and Figure 5 shows the steering wheel raised in inoperative driving position, and further showing the locking means for holding the wheel in this position.

Like characters of reference are used throughout the following specification and the accompanying drawing to designate corresponding parts.

In carrying out my invention, I provide an automobile steering wheel generally denoted at 1, and having three spokes 2 connecting the center of the wheel 3 with the rim 4. It will be understood that the wheel 1 will be supported upon the customary steering post 5.

I provide two pairs of split metal castings 6 and 7, which are respectively connected to a wheel spoke 2 and the adjacent rim section, and to the adjoining rim section nearest the casting. Alined pivot or hinge pins 8 are passed through the sections 7 and are threaded into the sections 6, thereby pivotally supporting the major portion of the steering wheel upon the lesser portion of the wheel which is positively supported on the steering post 5. It will be apparent from the drawing that all of the associated parts forming the hinges and connecting split sections will be flush and within the usual confines of an ordinary steering wheel. I have illustrated the steering wheel rim made with a suitable core within a rubber casing, but it will be understood that the wheel may be entirely cast of metal if desired.

The third spoke will be severed adjacent its inner end, and will be locked thereto by my improved latch mechanism, which consists of a slidable locking pin 9 which is pressed forwardly in locking position by the spring 10, and carried by the outer portion of the spoke, and a cooperating reciprocating trigger rod 11 engageable with the pin 9 adapted to force the pin 9 into its retracted position when the trigger 12 on the trigger rod 11 is pulled against the action of the spring 13, which normally holds the trigger rod in retracted position. The locking pin 9 will extend into the two parts of the spoke when in locked position, and fixed locking pin or lug 14 carried by the outer section of the spoke will be received within a socket in the inner spoke section, to additionally reinforce and lock the parts in firm position.

From the foregoing description, it will be apparent that the mode of operation will be as follows: When a person desires to get into or out of the driver's seat, he will pull the trigger 12 towards him, thereby unlocking and disconnecting the two sections of the spoke, and he will grasp the rim of the steering wheel, and push the same upwardly and forwardly upon the hinges formed by the split sections of castings 6 and 7, until the wheel assumes the position as illustrated in Figure 5 of the drawing, whereupon the lock 15 will automatically lock the wheel in this position due to the locking pin 16 being extended to obstruct the reverse movement of the wheel to its normal or driving position. When it is desired to move the steering wheel to its operative position, the locking pin 16 will be retracted by a suitable key, and the wheel swung downward to its normal or functioning position.

In summing up the several features and improvements of my invention, it will be noted that the various portions of the hinges are completely housed within the usual confines of a steering wheel. Secondly, the hinges are arranged in alined position well forward of the steering post, and thus affords the maximum space for entering or getting from behind the steering wheel, and third, a highly efficient and inexpensive steering wheel is provided which will be indispensable to the average car owner.

Many minor changes in detail of construction may be resorted to without departure from the spirit of the invention.

Having thus described my invention what I claim as new and desire to secure by Letters Patent of the United States is:

1. In a steering wheel construction, a pair of cooperating split metal castings interposed between a spoke and the adjacent rim sections, a second pair of cooperating split metal castings interposed between an adjacent spoke and the adjacent rim sections, alined hinge pins connecting each pair of split castings and completely housed within the same, means for detachably connecting the remaining spoke with the wheel hub, means for latching and unlatching the remaining spoke for respectively placing the wheel in driving position or in inoperative position when the major portion of the wheel is raised upwardly and forwardly to permit unobstructed getting into or out of the driver's seat, and a locking means carried by one of the split metal castings for retaining the wheel in its inoperative position.

2. In a steering wheel construction, a pair of cooperating split metal castings interposed between a spoke and the adjacent rim sections, a second pair of cooperating split metal castings interposed between an adjacent spoke and the adjacent rim sections, alined hinge pins connecting each pair of split castings and completely housed within the same, means comprising a retractible spring pressed pin for detachably securing the third spoke to the wheel hub, means for operating said pin, a second locking means carried by the third spoke for automatic engagement with the wheel hub, said wheel being capable of upward and forward swinging movement on a transverse axis forward of the transverse central axis through the wheel when said third spoke is disengaged from the wheel hub.

PRENTIS ENRIGHT ERICKSON.